(12) United States Patent
Candy

(10) Patent No.: US 6,690,169 B2
(45) Date of Patent: Feb. 10, 2004

(54) INTERFERENCE CANCELLING METAL DETECTOR INCLUDING ELECTRONIC SELECTION OF EFFECTIVE SENSING COIL ARRANGEMENT

(75) Inventor: Bruce Halcro Candy, Basket Range (AU)

(73) Assignee: BHC Consulting PTY LTD, Glenside (AU)

( * ) Notice: Subject to any disclaimer, the term of this patent is extended or adjusted under 35 U.S.C. 154(b) by 0 days.

(21) Appl. No.: 09/978,209

(22) Filed: Oct. 17, 2001

(65) Prior Publication Data

US 2002/0053909 A1 May 9, 2002

(30) Foreign Application Priority Data

Oct. 17, 2000 (AU) .............................. PR 0835
Oct. 18, 2000 (AU) .............................. PR 0818

(51) Int. Cl.⁷ .......................... G01V 3/10; G01V 3/165
(52) U.S. Cl. ...................... 324/329; 324/239
(58) Field of Search ................. 324/329, 334–336, 324/239

(56) References Cited

U.S. PATENT DOCUMENTS

| | | | | |
|---|---|---|---|---|
| 3,315,155 A | * | 4/1967 | Colani | 324/239 |
| 4,595,877 A | * | 6/1986 | Dulk | 324/239 |
| 5,537,041 A | | 7/1996 | Candy | |
| 5,576,624 A | | 11/1996 | Candy | |
| 6,326,790 B1 | * | 12/2001 | Ott et al. | 324/329 X |

* cited by examiner

*Primary Examiner*—Gerard R. Strecker
(74) *Attorney, Agent, or Firm*—Finnegan, Henderson, Farabow, Garrett & Dunner, L.L.P.

(57) ABSTRACT

Metal detection apparatus containing at least two inductive coils one of which acts as a transmit coil and all of which act as receive coils and processing circuitry wherein a proportion of the first receive electronic signal and a proportion of the second receive electronic signal may be selected to produce various first resultant linear combination signals for the purpose of improved interference cancelling.

6 Claims, 1 Drawing Sheet

INTERFERENCE CANCELLING METAL DETECTOR INCLUDING ELECTRONIC SELECTION OF EFFECTIVE SENSING COIL ARRANGEMENT

BACKGROUND OF THE INVENTION

1. Field of the Invention

A problem with all metal detectors, hand-held or industrial is susceptibility to environmental low frequency magnetic fields. These are caused mostly by mains harmonics and general mains noise, lightning even if distant sometimes, electronics such as TVs, computers and active fluorescent lighting, micro-atmospheric discharges and even the sun's low frequency various sources.

This is mostly combated by far field cancelling receive coils, most often in the form of a "figure-8". Usually the transmit coil is a simple mono-loop coil. Almost all conveyor type industrial metal detectors use such an arrangement.

The problem with this mono-loop transmit, figure-8 receive arrangement in handheld metal detectors is that the sensitivity to distant targets is substantially poorer than the conventional non-far field cancelling coils, such as the "double-D", "concentric" or the single mono-loop "transmit/receive" arrangement which is used mostly by pulse induction detectors.

In U.S. Pat. No. 5,576,624 I disclosed a metal detector apparatus which is capable of substantially reducing signals arising from ground mineralisation containing magnetic soils. Several models utilizing these principles have been commercialised and used highly successfully by gold prospectors and for land mine detection. There are two types of sensing coil arrangement mostly used with these detectors, namely the double-D and single mono-loop transmit/receive coils. A few sensing coils containing a mono-loop transmit, figure-8 receive have been used by some prospectors for use, for example, near power lines, electric fences, town environments, and near coil towing vehicles with ignition and generators, and in highly saline areas.

Each of these three different types of coil have associated pros and cons. For example, the mono-loop transmit/receive has the best performance for locating deep targets, but it is most susceptible to magnetic soil interference signals and thus is the most difficult to use. The double-D has the least soil interference but will not detect as deeply as the mono-loop. The figure-8 receive, mono-loop transmit is the only one of the three that will cancel environmental magnetic field interference, but has the poorest depth capability and is not as good as the double-D for ground signal suppression except when the ground is highly saline.

SUMMARY OF THE INVENTION

In one form the invention can be said to reside in a method for effecting metal detection using a metal detector including transmit and receive electronic timing control circuitry, power supplies, and receive and transmit signal electronic circuitry, and at least two inductive coils, a first and second coil, wherein at least the first coil when connected to the transmit signal electronic circuitry when operating is adapted to transmit magnetic pulses, and also to act as a receiver to receive magnetic field signals which when connected to the receive signal electronic circuitry produces at least one receive electronic signal, being a first electronic receive signal, and at least the second coil is adapted to receive magnetic field signals which when connected to the receive signal electronic circuitry produces at least one receive electronic signal, being a second receive electronic signal, and processing circuitry adapted to accumulate at least the first and second receive electronic signals, characterized in that at least a proportion of the first receive electronic signals is linearly combined with a proportion of the second receive electronic signal, to produce a first resultant linear combination signal which is further processed to produce an output signal for indicator means.

In preference the magnetic Eigen axis of the said first and second coils are substantially parallel, and the said proportion of the first receive electronic signal and proportion of the second receive electronic signal are selected to produce a first resultant linear combination signal which is substantially nulled to substantially uniform magnetic fields in the vicinity of both the said first and second coils.

In preference various said proportion of the first receive electronic signal and proportion of the second receive electronic signal may be selected to produce various first resultant linear combination signals.

In preference both the first and second coil are each adapted to transmit magnetic pulses, and also to act as receivers to receive magnetic field signals, when each are connected to the transmit signal electronic circuitry and connected to the receive signal electronic circuitry when operating;

wherein the receive electronics produces a first electronic receive signal resulting from the first coil when adapted to receive and also a second electronic receive signal resulting from the second coil when adapted to receive.

In a further form of this invention, this can be said to reside in a metal detector apparatus including, transmit timing control circuitry, power supplies, and receive signal circuitry, and a sensing coil including two inductive coils, a first and second coil;

wherein the first coil is adapted to transmit a magnetic field when operating with electrical current flowing through the said first coil and the first coil is adapted to act as a receiver to receive magnetic fields to produce at least one receive signal, a first receive signal, and wherein the second coil is adapted to act as a receiver to receive magnetic fields to produce at least one receive signal, a second receive signal, and may be adapted to transmit a magnetic field when operating with electrical current flowing through the said second coil, and includes processing circuitry to act to accumulate the receive signals from both the coils, characterized in that either only one of the first or second signals may be selected, or a proportion of the first signal may be either added or subtracted from a proportion of the second signal.

This invention discloses a means to use one sensing coil with the capability of electronically selecting all three of the effective modes of operation of each of the said three different sensing coil types, but not with all the disadvantages of each coil type. There are basically six different useful arrangements.

As an example, consider the single sensing coil to be a double-D which will obviously operate as a double-D with no extra advantage or disadvantage. This is one of the six useful arrangements.

It may be used to cancel far fields but without the substantial depth capability limitation of the figure-8 receive, mono-loop transmit coil. There are three different ways this can be achieved:

Firstly, this can be achieved by using the first coil as a transmitter and receiver and the second coil as a receiver. If;

the number of turns in the first coil is Txn, and the number of turns in the second coil is Rxn, the average area enclosed by the mean magnetic path of the first coil is Txa, and the average area enclosed by the mean magnetic path of the second coil is Rxa, the electronic gain of the second coil preamplifier if used is Rxg, and the electronic gain of the first coil preamplifier if used is Txg, and the output signals from the preamplifiers, if used, or if not, the output signal of the coils are linearly subtracted in the ratio of $$TxnTxaTxg/(RxnRxaRxg) \qquad (i).$$

This will ensure that far fields, that is near locally uniform fields in the vicinity of the sensing coil, are electronically cancelled or "nulled". It is only possible to electronically cancel signals resulting from far magnetic fields of any orientation if the Eigen axes of the first and second coils are parallel. Here I define the Eigen axis of a coil as the axis of symmetry of the static far magnetic field generated solely from the said coil when a D.C. current flows in the said coil.

However, the effective receive sensitivity from deeply buried targets is not effectively nulled symmetrically as is the case with a figure-8 receive coil. Again consider that a traditional double-D is being used, with the first and second coils having similar geometries but with one coil orientated as the mirror image of the other, and the straightest parts of the mirror imaged double-Ds being partially symmetrically overlapping in these regions. In this example, the transmit field is strongest on the first coil side of the sensing coil. Thus when the sensing coil is passed over buried targets, the greatest target signal response occurs when the target lies asymmetrically below on the first coil side. The deep target null is shifted asymmetrically below the second coil side.

Secondly, both coils may transmit simultaneously and receive simultaneously wherein ratio (i)=1 and the first and second signals are subtracted and then processed. This will give similar results to the figure-8 receive/mono-loop transmit sensing coil, except that in the area of the coil overlap, the transmit field and receive sensitivity profile are complex.

Thirdly, coils 1 and 2 may transmit alternately on each successive transmit cycle and both coils receive simultaneously wherein ratio (i)=1 and the first and second signals are subtracted and then processed. This will give similar results to the first far field nulling arrangement, except that the sensitivity profile is symmetrical.

The double-D coil may also be used as a sensing coil whose operation is part double-D and part mono-loop in performance. This may be achieved by two different arrangements:

Firstly the first coil acts as a transmitter and receiver and the second coil acts as a receive coil and the first and second signals are added.

Secondly, both coils may transmit simultaneously with the same polarity and receive simultaneously wherein the first and second signals are added. This will give similar results to the mono-loop transmit/receive sensing coil except that in the area of the coil overlap, the transmit field and receive sensitivity profile are complex.

BRIEF DESCRIPTION OF THE DRAWING

For a better understanding of this invention reference will now be made to an embodiment which shall now be described with the assistance of drawing wherein.

DESCRIPTION OF THE PREFERRED EMBODIMENT

Figure 1:
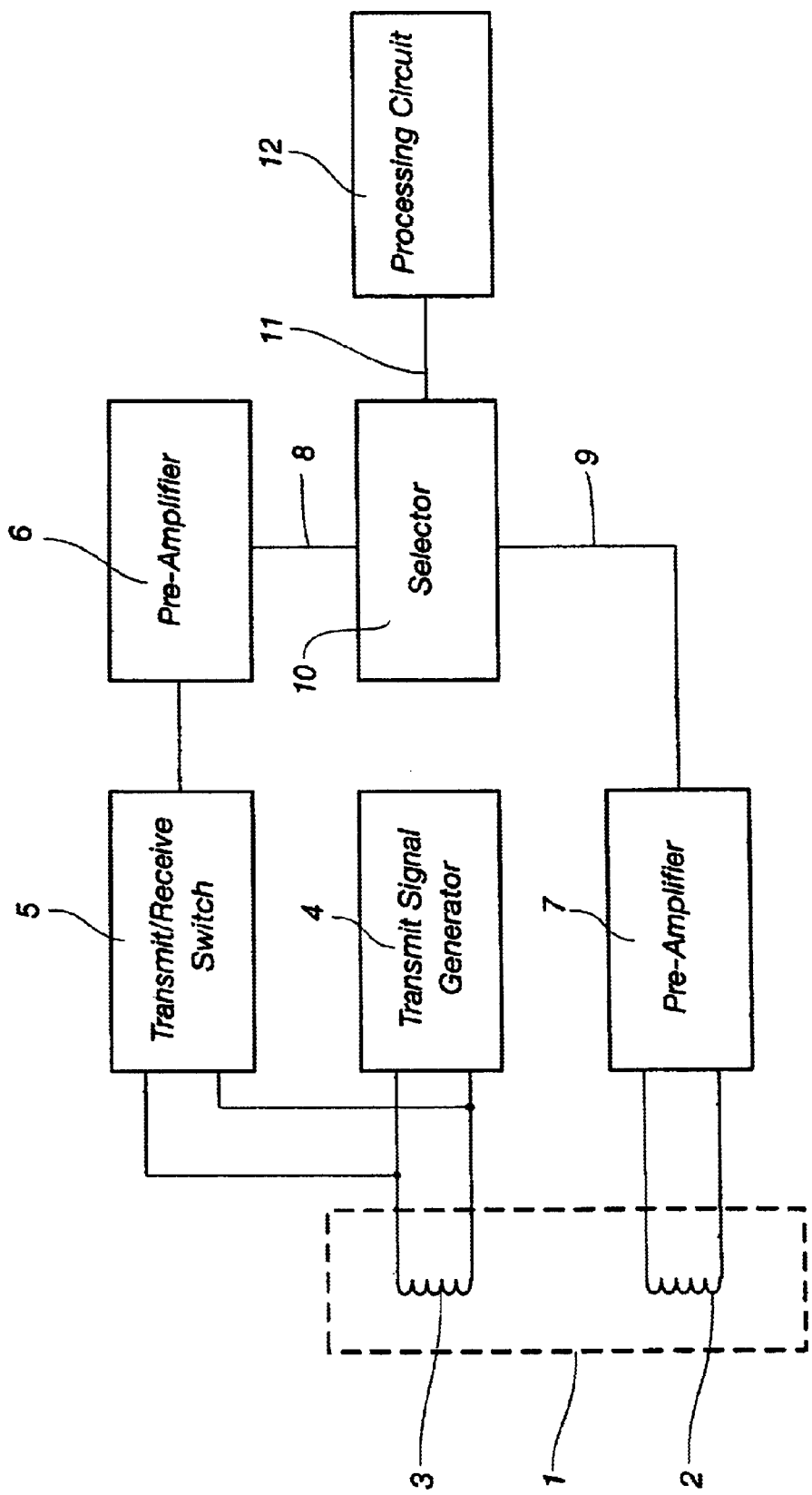
FIG. 1 is an example of a schematic view for a means of electronic selection which enables three modes of reception for a single double-D coil.

In FIG. 1, a sensing coil 1 contains a receive coil winding 2 and a transmit coil winding 3 which may also act as a receiver Transmit coil winding 3 is connected to transmit signal generating circuitry 4 and also to a transmit/receive switch 5. The output of 5 is connected to a preamplifier 6. Receive coil winding 2 is connected to a preamplifier 7. The output of 6 namely 8 is connected to a selector 10 as too is the output 9 of 7. The selector 10 either linearly adds the signals at 8 and 9, or subtracts them, or only selects the signal at 9. The output of 10 signal 11 is passed to further processing circuitry 12 which may include, sampling and/or demodulation, signal weighting, filtering and indicator circuitry. The functions of 10 and 12 may be combined, by digital signal processing for example. Assuming the same sign senses, when 9 and 8 are linearly subtracted, if the ratio (i)=1, then far fields (near uniform) are cancelled. If 8 and 9 are linearly added, the metal detector's response is half that of a conventional coil receive coil and half that of the transmit coil acting as a receive coil as well. It only 9 is selected, the metal detectors response is simply that of a conventional sensing coil.

What is claimed is:

1. A method for effecting metal detection using a metal detector including transmit and receive electronic timing control circuitry, power supplies, and receive and transmit signal electronic circuitry, and at least first and second inductive coils, comprising the steps of:

connecting at least the first coil to said transmit signal electronic circuitry to transmit magnetic field signals from said at least first coil when a pulsed current flows through said first coil in response to signals from said electronic timing control circuitry;

connecting at least the first coil to said receive signal electronic circuitry to thereby produce a first receive electronic signal;

connecting at least the second coil to said receive signal electronic circuitry to thereby produce a second receive electronic signal in response to signals from said electronic timing control circuitry;

linearly combining at least a portion of said first receive electronic signal with a proportion of said second receive electronic signal;

producing a first resultant linear combination signal; and processing said combination signal to produce an output signal for coupling to indicator means.

2. A method as in claim 1, wherein magnetic Eigen axes of the first and second coils are substantially parallel, and the proportion of the first receive electronic signal and proportion of the second receive electronic signal are selected to produce a first resultant linear combination signal which is substantially nulled to substantially uniform magnetic fields in the vicinity of both the first and second coils.

3. A method as in claims 1 or 2, wherein various proportions of the first receive electronic signal and the second receive electronic signal may be selected to produce corresponding first resultant linear combination signals.

4. A metal detector apparatus including at transmit and receive electronic timing control circuitry, power supplies, and receive and transmit signal electronic circuitry, and at least first and second inductive coils, wherein at least the first coil, when connected to the transmit signal electronic circuitry in response to said pulsed signals from said electronic timing control circuitry is adapted to transmit magnetic pulses, and also act as a receiver to receive magnetic field signals which, when connected to the receive signal electronic circuitry, produces at least a first electronic receive signal, and at least the second coil is adapted to receive magnetic field signals which, when connected to the receive signal electronic circuitry produces at least a second receive electronic signal, and processing circuitry for accumulating at least the first and second receive electronic signals, wherein at least a proportion of the first receive electronic signals is linearly combined with a proportion of the second receive electronic signal, to produce a first resultant linear combination signal which is further processed to produce an output signal coupled to indicator means.

5. A metal detector apparatus as in claim 4, wherein magnetic Eigen axes of the first and second coils are substantially parallel, and the said proportion of the first receive electronic signal and proportion of the second receive electronic signal are selected to produce a first resultant linear combination signal which is substantially nulled to substantially uniform magnetic fields in the vicinity of both the said first and second coils.

6. A metal detector apparatus as in claims 4 or 5, wherein various proportions of the first receive electronic signal and second receive electronic signal may be selected to produce corresponding first resultant linear combination signals.

* * * * *